United States Patent
Derly et al.

(10) Patent No.: US 12,529,691 B2
(45) Date of Patent: Jan. 20, 2026

(54) METHOD FOR ANALYSING THE QUANTITY OF CLAY IN A SAND

(71) Applicant: CHRYSO, Issy les Moulineaux (FR)

(72) Inventors: Christophe Derly, Izy (FR); Antoine Colas, Bourg-la-Reine (FR)

(73) Assignee: CHRYSO, Issy les Moulineaux (FR)

( * ) Notice: Subject to any disclaimer, the term of this patent is extended or adjusted under 35 U.S.C. 154(b) by 1276 days.

(21) Appl. No.: 17/296,872

(22) PCT Filed: Nov. 25, 2019

(86) PCT No.: PCT/EP2019/082427
§ 371 (c)(1),
(2) Date: May 25, 2021

(87) PCT Pub. No.: WO2020/109231
PCT Pub. Date: Jun. 4, 2020

(65) Prior Publication Data
US 2022/0024825 A1     Jan. 27, 2022

(30) Foreign Application Priority Data

Nov. 27, 2018 (FR) ..................... 18 71917

(51) Int. Cl.
*G01N 33/38* (2006.01)
*C04B 28/02* (2006.01)
(Continued)

(52) U.S. Cl.
CPC ........... *G01N 33/383* (2013.01); *C04B 28/02* (2013.01); *C04B 40/0032* (2013.01);
(Continued)

(58) Field of Classification Search
CPC .............................. G01N 33/383; G01N 31/22
See application file for complete search history.

(56) References Cited

U.S. PATENT DOCUMENTS

2009/0241696 A1* 10/2009 Jacquet ................... C04B 14/06
  73/863.23
2016/0355441 A1* 12/2016 Tregger .................. B28C 7/024

FOREIGN PATENT DOCUMENTS

EP    1 015 398    7/2000
FR    2 875 496    3/2006
(Continued)

OTHER PUBLICATIONS

Nehdi, M. L. "Clay in cement-based materials: Critical overview of state-of-the-art," Construction and Building Materials 51 (2014) 372-382 (Year: 2014).*
Pike, A. et al. "Alternative approach to clay control in green sand." SciFinder abstract of Transactions of the American Foundry Society 121 (2013) 331-335 (Year: 2013).*
Yool, A.I.G. et al. "Improvements to the methylene blue dye test for harmful clay in aggregates for concrete and mortar," Cement and Concrete Research, vol. 28, No. 10, pp. 1417-1428, 1998 (Year: 1998).*

(Continued)

*Primary Examiner* — Jennifer Wecker
*Assistant Examiner* — Michelle Adams
(74) *Attorney, Agent, or Firm* — NIXON & VANDERHYE

(57) ABSTRACT

Disclosed is use of a compound of formula (I) to determine the quantity of clay in a sand and/or to determine the amount of CMA compound to be added to a hydraulic binder composition using a sand:

$$R^1-(OA)_n-XR^2 \qquad (I)$$

where: $R^1$ is a linear or branched C1 to C4 alkyl groups, or a coloured compound; $R^2$ is a coloured compound; A, each the same or different, are independently a —$CH_2$—$CH_2$— group or —$CH(CH_3)$—$CH_2$— group; n is an integer of between 1 and 500, preferably between 4 and 250; and X is O or NH.

15 Claims, 2 Drawing Sheets

(51) Int. Cl.
  *C04B 40/00*   (2006.01)
  *G01N 31/22*   (2006.01)
  *C04B 14/06*   (2006.01)
  *C04B 14/10*   (2006.01)
  *C04B 103/32*   (2006.01)

(52) U.S. Cl.
  CPC .............. *G01N 31/22* (2013.01); *C04B 14/06* (2013.01); *C04B 14/10* (2013.01); *C04B 2103/32* (2013.01)

(56) References Cited

FOREIGN PATENT DOCUMENTS

| JP | H10-1628 | 1/1998 |
|---|---|---|
| WO | 98/58887 | 12/1998 |
| WO | 2006/032786 | 3/2006 |
| WO | 2009/156335 | 12/2009 |
| WO | 2011/121230 | 10/2011 |

OTHER PUBLICATIONS

International Search Report for PCT/EP2019/082427 dated Jan. 24, 2020, 5 pages.
Written Opinion of the ISA for PCT/EP2019/082427 dated Jan. 24, 2020, 5 pages.
French Search Report for FR 1871917 dated Jul. 4, 2019, 4 pages.
Prajapati et al., "Azomesogens with methoxyethyl tail: Synthesis and characterization", Journal of Chemical Sciences, May 2005, vol. 117, No. 3., pp. 255-261 (7 total pages).
Prajapati et al., "Azomesogens containing an ethoxyethyl terminal chain: synthesis and characterization", Liquid Crystals, Jun. 2004, vol. 31, No. 6, pp. 889-894 (6 total pages).
Peng et al., "Azobenzene moiety variation directing self-assembly and photoresponsive behavior of azo-surfactants", Journal of Material Chemistry C, May 21, 2014, vol. 2, No. 39, pp. 8303-8312 (10 total pages).

\* cited by examiner

METHOD FOR ANALYSING THE QUANTITY OF CLAY IN A SAND

CROSS-REFERENCE TO RELATED APPLICATIONS

This application is the U.S. national phase of International Application No. PCT/EP2019/082427 filed Nov. 25, 2019 which designated the U.S. and claims priority to FR 18 71917 filed Nov. 27, 2018, the entire contents of each of which are hereby incorporated by reference.

BACKGROUND OF THE INVENTION

Field of the Invention

The present invention concerns a method for analysing the quantity of clay in a sand. In particular, this method allows anticipation of over-consumption of superplasticizer due to the presence of clays and to take action accordingly.

Description of the Related Art

The presence of sodium clays such as Montmorillonite in sands or aggregates can strongly affect the workability of hydraulic binder compositions and concrete compositions in particular. The sheet structure of clays promotes absorption of water and intercalation of elements contained in hydraulic binder compositions such as superplasticizers and in particular those carrying poly(alkylene) glycol grafts. These phenomena cause an increase in the viscosity of the hydraulic binder paste and hence loss of workability, Over-dosing of superplasticizer is therefore required to offset consumption thereof by these clays and to maintain desired workability. This phenomenon is not observed with calcium clays.

Dosing of clay quantity is generally obtained with the methylene blue test (Standard NF EN 933-9). However, this analysis is not selective for potentially problematic clays and in addition it is sensitive to the quantity of sand fines.

There is therefore an advantage in proposing an analysis protocol for the quantification of content levels of superplasticizer-consuming clays in sands, which in particular allows predicting of the dosage of Clay Mitigation Agent (CMA).

SUMMARY OF THE INVENTION

It is therefore one objective of the present invention to provide an analysis method to determine the quantity of superplasticizer-consuming clays.

It is a further objective of the present invention to provide said method allowing the prediction of CMA dosage.

It is a further objective of the present invention to provide said method which is simple and able to be used on-site.

Other objectives will become apparent on reading the following description of the invention.

All these objectives are met with the present invention which concerns the use of a compound of formula (I) to analyse and determine the quantity of clay in a sand, in particular to determine the quantity of clay in a sand by colorimetry, $$R^1-(OA)_n-XR^2 \quad (I)$$

where:
$R^1$ is a linear or branched C1 to C4 alkyl group, or a coloured compound;

$R^2$ is a coloured compound;
A, each the same or different, is independently a $CH_2$—$CH_2$— group or —$CH(CH_3)$—$CH_2$— group;
n is an integer of between 1 and 500, preferably between 4 and 250;
X is O or NH.

In the present invention, by coloured compound it is meant any type of compound having radiation adsorption with wavelengths belonging to the visible range. It is to be understood that when $R^2$ and optionally $R^1$ is a coloured compound, it is a residue of a coloured compound further to the reaction of a coloured compound with the XH function. Preferably, the coloured compounds of the invention have a function enabling their reaction with the XH function thereby leading to a residue of the coloured compound, preferably this function is the COOH function whether or not neutralised.

Preferably, for the formula (I) compounds of the invention, $R^1$ is a methyl, ethyl, propyl or butyl group, preferably methyl.

Preferably, for the formula (I) compounds of the invention, A is a —$CH_2$—$CH_2$— group.

Preferably, for the formula (1) compounds X is O or N, preferably O.

Preferably, for the formula (1) compounds n is an integer of between 1 and 500.

Preferably, for the formula (1) compounds of the invention:
$R^1$ is a methyl, ethyl, propyl or butyl group; and/or
A is a group —$CH_2$—$CH_2$—, —$CH(CH_3)$—$CH_2$—; and/or
X is O or N, preferably 0; and/or
n is an integer of between 1 and 500, preferably between 4 and 250.

Preferably, for the formula (1) compounds of the invention:
$R^1$ is a methyl group;
A is a —$CH_2$—$CH_2$— group;
X is O; and
n is an integer of between 4 and 250.

Preferably, in the formula (1) compounds of the invention, the coloured compound is selected from among the following groups:
Derivatives of azobenzene having a COOH function whether or not neutralised reacting with the XH function;
Derivatives of acridine having a COOH function whether or not neutralised reacting with the XH function;
Derivatives of anthraquinone having a COOH function whether or not neutralised reacting with the XH function;
Derivatives of phthalocyanines having a COOH function whether or not neutralised reacting with the XH function;
Derivatives of quinone having a COOH function whether or not neutralised reacting with the XH function;
Derivatives of indophenol having a COOH function whether or not neutralised reacting with the XH function;
Derivatives of oxazone having a COOH function whether or not neutralised reacting with the XH function;
Derivatives of thiazine having a COOH function whether or not neutralised reacting with the XH function;
Derivatives of xanthene having a COOH function whether or not neutralised reacting with the XH function;
Derivatives of fluorone having a COOH function whether or not neutralised reacting with the XH function.

By derivatives in the present invention, it is meant compounds comprising the functions mentioned above.

Preferably, in the formula (1) compounds the coloured compound is selected from among the following groups:

Derivatives of azobenzene having a COOH function whether or not neutralised reacting with the XH function;

Derivatives of xanthene having a COOH function whether or not neutralised reacting with the XH function.

Preferably, the coloured compound is selected from among:

Derivatives of azobenzene having a COOH function whether or not neutralised reacting with the XH function;

Derivatives of rhodamine having a COOH function whether or not neutralised reacting with the XH function;

Derivatives of fluorescein having a COOH function whether or not neutralised reacting with the XH function.

Preferably, the coloured compound is selected from among:

Derivatives of azobenzene having a COOH function whether or not neutralised reacting with the XH function;

Derivatives of rhodamine having a COOH function whether or not neutralised reacting with the XH function.

Preferably, the coloured compound R² and optionally R¹ is selected from among the compounds of following formula:

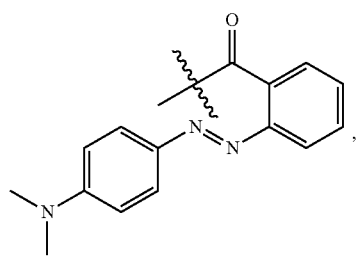

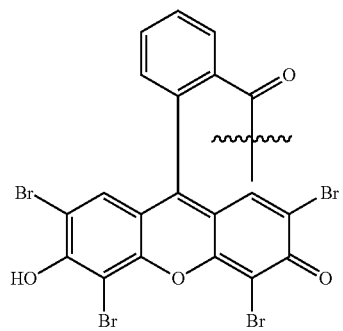

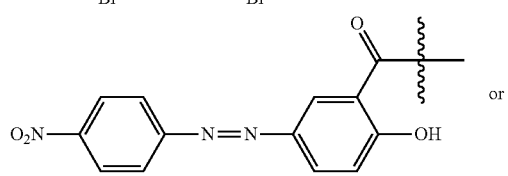

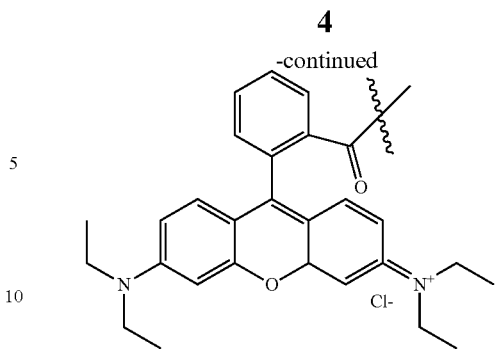

Preferably the coloured compound $R^2$ and optionally $R^1$ is selected from among the compounds of following formula:

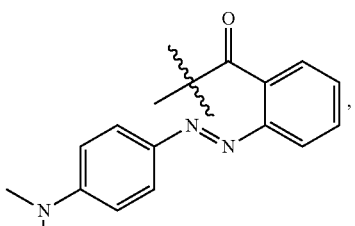

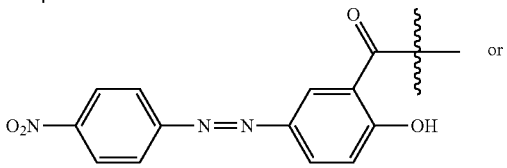

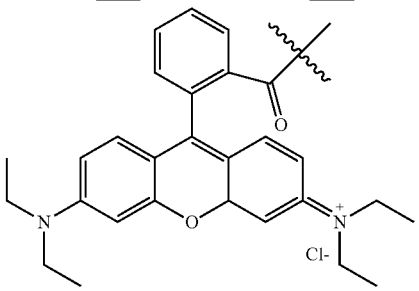

Particularly advantageously, the inventors have shown that the formula (I) compounds of the invention intercalate into the sheets of clays. This intercalation of the formula (I) compounds translates as reduced intensity of the colour of the coloured compound. This reduction in the intensity of the colour of the coloured compound allows determination of the intercalated amount of formula (I) compounds which allows determination of the quantity of clay in the sand.

Particularly advantageously, the formula (I) compounds of the invention specifically allow determination of the quantity of clays harmful for superplasticizers i.e. the quantity of clays which intercalate superplasticizers. Particularly advantageously, the formula (I) compounds of the invention will not intercalate into clays which do not intercalate superplasticizers. Therefore, the formula (I) compounds and the methods used are highly specific for superplasticizer-intercalating clays.

The formula (I) compounds can be prepared with a preparation method comprising the reaction between a compound of formula (II) and a coloured compound comprising at least one reactive function with the XH group of the compound of formula (II):

$$Y-(OA)_n-XH \quad \quad (II)$$

where:
  Y is H or a linear or branched C1 to C4 alkyl group;
  A, X and n are such as defined for the formula (I) compounds.

The method of the present invention can be conducted at a temperature of between 40° C. and 200° C., preferably between 100° C. and 185° C.

The coloured compounds are selected from among the following compounds:
  Derivatives of azobenzene having a COOH function whether or not neutralised reacting with the XH function;
  Derivatives of acridine having a COOH function whether or not neutralised reacting with the XH function;
  Derivatives of anthraquinone having a COOH function whether or not neutralised reacting with the XH function;
  Derivatives of phthalocyanines having a COOH function whether or not neutralised reacting with the XH function;
  Derivatives of quinone having a COOH function whether or not neutralised reacting with the XH function;
  Derivatives of indophenol having a COOH function whether or not neutralised reacting with the XH function;
  Derivatives of oxazone having a COOH function whether or not neutralised reacting with the XH function;
  Derivatives of thiazine having a COOH function whether or not neutralised reacting with the XH function;
  Derivatives of xanthene having a COOH function whether or not neutralised reacting with the XH function;
  Derivatives of fluorone having a COOH function whether or not neutralised reacting with the XH function.

By derivatives in the present invention, it is meant compounds comprising the functions mentioned above.

Preferably in the formula (I) compounds, the coloured compound is selected from among the following groups:
  Derivatives of azobenzene having a COOH function whether or not neutralised reacting with the XH function;
  Derivatives of xanthene having a COOH function whether or not neutralised reacting with the XH function.

Preferably the coloured compound is selected from among:
  Derivatives of azobenzene having a COOH function whether or not neutralised reacting with the XH function;
  Derivatives of rhodamine having a COOH function whether or not neutralised reacting with the XH function.

Preferably, the coloured compound is selected from among
  Derivatives of azobenzene having a COOH function whether or not neutralised reacting with the XH function;
  Derivatives of rhodamine having a COOH function whether or not neutralised reacting with the XH function;
  Derivatives of fluorescein having a COOH function whether or not neutralised reacting with the XH function.

Preferably, the coloured indicator compound is selected from among the following compounds:

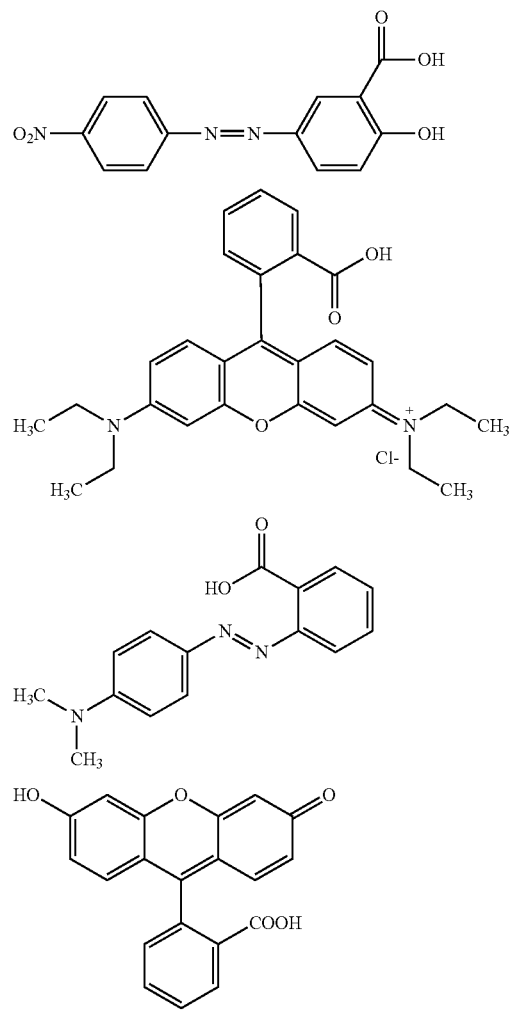

Preferably, the coloured indicator compound is selected from among the following compounds:

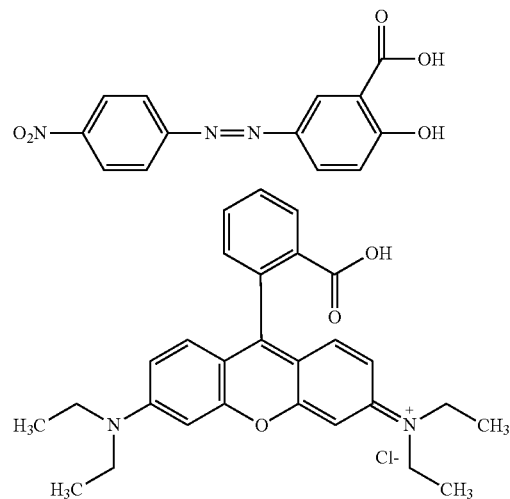

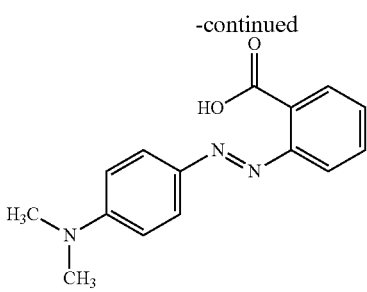

Preferably, the coloured compounds are the following compounds:

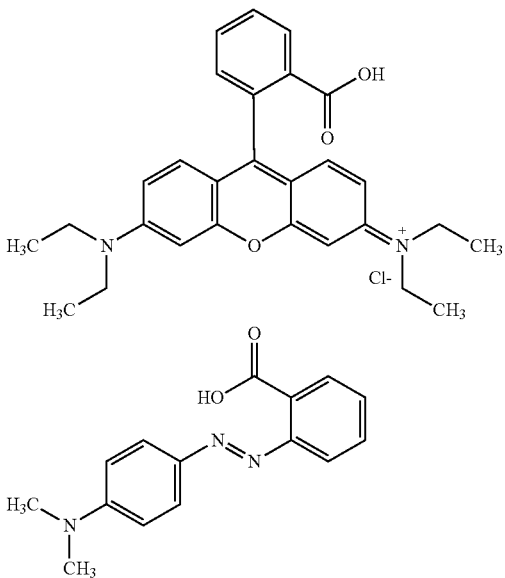

Preferably, in the formula (II) compound X is O.

Preferably, in the formula (II) compound Y is methyl, ethyl, propyl or butyl, preferably methyl.

Preferably, in the formula (II) compound A is —$CH_2$—$CH_2$—.

Preferably, in the formula (II) compound n is an integer of between 1 and 500, preferably between 4 and 250.

Preferably, for the formula (II) compounds of the invention:

$R^1$ is a methyl, ethyl, propyl or butyl group, preferably methyl; and/or

A is a —$CH_2$—$CH_2$— group; and/or

X is O; and/or n is an integer of between 1 and 500, preferably 4 and 250.

Preferably, for the formula (II) compounds of the invention:

$R^1$ is a methyl group;

A is a —$CH_2$—$CH_2$— group;

X is O;

n is an integer of between 4 and 250.

Preferably, in the method of the invention, the molar ratio of coloured compound/formula (II) compound is between 2 and 1, preferably 1.

The present invention also concerns a composition (C) comprising a formula (I) compound and use thereof for analysing and determining the quantity of clay in a sand, in particular for determining the quantity of clay in a sand by colorimetry.

The composition of the invention may also comprise a Ph buffer solution so that the composition has a pH at which the formula (I) compound exhibits radiation adsorption having wavelengths belonging to the visible range. It is within the reach of persons skilled in the art to determine the pH buffer to be used and the target pH, the objective being that composition (C) has the desired colour. For example, when the coloured compound is the following compound:

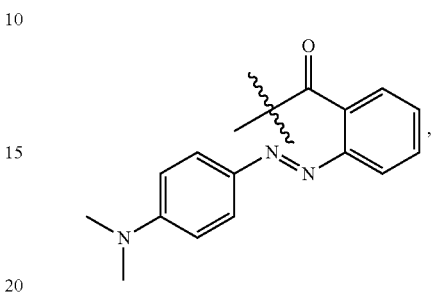

the pH of composition (C) is between 4 and 5.5, in particular through the use of a pH buffer selected for example from the group formed by acetic acid/sodium/potassium acetate; dihydrogen phosphate/sodium/potassium, di-sodium/di-potassium hydrogen phosphate; sodium and/or potassium dihydrogen phosphates.

Preferably, composition (C) of the invention is an aqueous composition comprising from 0.01 to 0.1 weight % of formula (I) compound.

The inventors have advantageously shown that the compounds of the invention can be used to determine the quantity of clay in a sand.

This is of particular importance to estimate future consumption of plasticizer or superplasticizer, even to estimate the dosage of any composition intended to offset the negative effect of clays in a concrete composition. As previously indicated, the formula (I) compounds of the invention intercalate into the sheets of clays similar to the molecules of superplasticizer or plasticizer. This intercalation of the formula (I) compounds translates as reduced intensity of the colour of the coloured compound. This reduction in the colour intensity of the coloured compound allows determination of the quantity of intercalated formula (I) compounds and hence consumed by the sand. It is thereafter possible to determine the quantity of clays contained in the sand. This makes it possible to predict the amount of superplasticizer or plasticizer or any other CMA compound to be added in order to reduce and even eliminate the harmful effects of clays on maintained workability.

Preferably, CMAs are described in patent application EP1015398.

The CMA may also be a compound for example from the CHRYSO®Quad range, preferably CHRYSO®Quad 800.

The present invention also concerns the use of a formula (I) compound or of a composition (C) of the invention to determine the amount of CMA to be added to a hydraulic binder composition, in particular to reduce or even eliminate the harmful effects of clays contained in a sand on maintained workability.

The present invention also concern's the above-described formula (I) compounds and compositions (C) as such.

The present invention therefore concerns a method for determining the quantity of clay in a sand comprising the following steps:

a) Providing a composition (C) of the invention;

b) Taking a sample of the sand to be analysed;

c) Mixing composition (C) with the sand sample in a container and agitating;
d) Filtering the mixture obtained at step c);
e) Determining the concentration of clays in the sand as a function of the colour of the solution obtained at step d).

It is to be understood that the method of the invention allows determination of the quantity of clay having an impact on the workability of hydraulic binder compositions, in particular clays in which the sheet structure is intercalated by superplasticizers. Therefore, preferably, the method of the invention allows determination of the quantity of phyllosilicate clay in a sand, preferably montmorillonites, more preferably sodium montmorillonites.

In one embodiment, step e) can be performed by visual determination of the colour and correlation of this colour with a range of clay quantities.

In another embodiment, step e) can be performed by photometric measurement of the colour. In this case, step e) comprises a step e1) for photochemical measurement of the absorbance of the filtrate obtained at step d) and a step e2) to subtract the value obtained at e) from the photochemical measurement of the absorbance of composition (C), and entering the value onto a calibration curve to determine the weight percentage of clay in the sand. The method of the present invention may therefore also comprise a preliminary step a0) for photometric measurement of the absorbance of composition (C).

Preferably, agitation at step c) is performed manually by upturning the container containing the mixture, for example by upturning the container at least 60 times, for example 100 times.

Photometric measurement of the absorbance of composition (C) and of the filtrate obtained at step d) can be carried out using any method known to skilled persons and using any equipment having a wavelength compatible with the coloured indicator compound of the formula (I) compound. For example, this measurement is performed with a colorimeter e.g. of laser wavelength of between 400 and 700 nm, preferably between 475 and 600 nm.

In the event that the coloured compound is of formula:

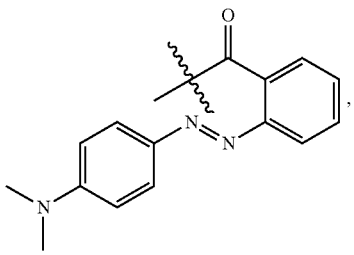 [SMILES: *C(=O)c1ccccc1/N=N/c1ccc(N(C)C)cc1]

measurement is preferably performed with a colorimeter having a laser wavelength of between 400 and 700 nm, preferably between 475 and 600 nm.

Before any photometric measurement of absorbance, the method of the invention may advantageously comprise photometric measurement of the absorbance of a blank. The blank can be water or, if composition (C) comprises a buffer solution, the blank can be obtained with this buffer solution. The preparation of a blank avoids any variation in measurement related to an element external to the mixture to be analysed e.g. the container comprising the mixture to be analysed.

Step d) to filter the mixture obtained at step c) can be conducted in any manner known to skilled persons. Preferably, the mixture at the end of step c) is left to settle, preferably between 1 and 60 minutes, preferably between 1 and 30 minutes. This settling step advantageously allows the finest particles to fall to the bottom of the container preventing clogging of the filter. The supernatant is collected with any suitable equipment e.g. a syringe and filtered preferably on a filter having porosity of between 0.25 and 5 µm, preferably between 0.25 and 2 µm. Preferably the amount of filtrate to be collected for performing photometric measurement is dependent on the equipment used and can be determined by skilled persons, for example the volume is at least 10 ml.

Preferably, the sand sample taken corresponds to a weight of between 10 and 100 g. Preferably, the amount of composition (C) added to the sand sample is at least 25 ml, preferably of between 25 and 100 ml.

The method of the invention may also comprise a pH adjustment step before step e) to obtain a range of pH values allowing visualisation of the colour of the coloured compound.

To determine the quantity of clay contained in the sand sample, a calibration curve needs to be plotted. This calibration curve can be plotted using any method known to skilled persons, In particular, the calibration curve can be obtained for example:
  by photometric measurement or visual detection of the change in colour of a clay-free sand (e.g. pure AFNOR sand) and a clay-free sand to which different known quantities of clays have been added;
  by measurement of the total organic carbon (TOC) of a clay-free sand (e.g. pure AFNOR sand) and a clay-free sand to which different known quantities of clays have been added;
  by measurement of the total organic carbon (TOC) of a clay-free sand (e.g. pure AFNOR sand) and sands comprising clays.

Without wishing to be bound by any theory, the consumption of poly(alkylene) glycol by clays, Montmorillonite in particular, is determined by the difference between the amount of poly(alkylene) glycol in solution before adding sand to the poly(alkylene) glycol solution and after a contact time of 5 min between the sand and this solution. The TOC content in the filtrate of a sand suspension without poly(allylene) glycol is also measured and is used as blank for TOC measurements.

TOC measurement is performed on the initial solutions and the filtrates with a SHIMADZU TOC-VCPN analyser. TOC is calculated by the difference between the amount of total carbon (obtained by carbonisation of the solution and infrared measurement of the amount of $CO_2$ released) and the amount of inorganic carbon (obtained by acidification of the solution at pH<1 and release of dissolved $CO_2$ by bubbling with synthetic air). The amount of consumed poly(alkylene) glycol is calculated by the difference between the amount added to the initial solution and the amount measured in the filtrates. In the present invention, TOC measurements are carried out after filtering the supernatant resulting from contacting of the sand with the solution of composition (C) of the invention.

The calibration curve used to perform step e) of the invention can be obtained in the following manner:
  a known amount of composition (C) of the invention is added to a known amount of clay-free sand (e.g. pure AFNOR sand), mixed, filtered (mixing and filtering can preferably be the same as in steps c) et d) mentioned above), and the colour of the filtrate obtained is observed;

a known amount of composition (C) of the invention is added to different mixtures comprising a known amount of clay-free sand (e.g. pure AFNOR sand) and a known amount of clays, mixed, filtered (mixing and filtering can preferably be the same as in steps c) and d) mentioned above, and the different colours of the filtrates obtained are observed;

a colour gradient is determined corresponding to different ranges of clay concentration in the sand.

The calibration curve allowing the performing of step e) of the invention can also be obtained in the following manner:

photometric measurement of composition (C) of the invention is performed;

a known amount of composition (C) of the invention is added to a known amount of clay-free sand (e.g. pure AFNOR sand), mixed, filtered (mixing and filtering can preferably be the same as in steps c) and d) mentioned above) and photometric measurement of the filtrate obtained is performed from which the value of the photometric measurement of composition (C) is subtracted;

a known amount of composition (C) of the invention is added to different mixtures comprising a known amount of clay-free sand (e.g. pure AFNOR sand) and a known amount of clays, mixed, filtered (mixing and filtering can preferably be the same as in steps c) and d) mentioned above) and photometric measurement of the filtrates obtained is performed from which the value of the photometric measurement of composition (C) is subtracted;

the absorbance curve is determined as a function of the concentration of clays in the sand.

The calibration curve allowing the performing of step e) of the invention can also be obtained in the following manner:

photometric measurement of composition (C) of the invention is performed;

the TOC is measured of a known amount of clay-free sand (e.g. pure FNOR sand);

a known amount of composition (C) of the invention is added to a known amount of clay-free sand (e.g. pure AFNOR sand), filtered, mixed (mixing and filtering can preferably be the same as in steps c) and d) mentioned above) and photometric measurement of the filtrate obtained is performed from which the value of the photometric measurement of composition (C) is subtracted, the TOC value is connected with the photometric value which will give an absorbance value for a clay-free sand;

the TOC is measured of a known amount of at least two commercial sands (e.g. Osman sand, Signes sand, St Marthe sand, Lecieux sand, Fulchiron sand, Vernou sand, Vesseny sand, Goutrens sand, Bernieres sand, Inerti Salinello sand, Siegwart sand, TRK sand, Sail s/s Couzan sand);

a known amount of composition (C) of the invention is added to at least two commercial sands (e.g. Osman sand, Signes sand, St Marthe sand, Lecieux sand, Fulchiron sand, Vernou sand, Vesseny sand, Goutrens sand, Bernieres sand, Inerti Salinello sand, Siegwart sand, TRK sand, Sail s/s Couzan sand), mixed, filtered (mixing and filtering can preferably be the same as in steps c) et d) mentioned above) and photometric measurement is performed of the different filtrates obtained from which the value of the photometric measurement of composition (C) is subtracted, and the TOC value is connected with the photometric value obtained which gives the absorbance value for a known concentration of clay;

the absorbance curve is determined as a function of the clay concentration in the sand.

The relationship between the TOC value (consumed MPEG) and clay concentration (Eq Mnt) is the following:

$$EqMnt = \frac{m_{consumed\ MPEG} + 0.3648}{1.1942} \quad (1)$$

The calibration curve allowing the performing of step e) of the invention can also be obtained in the following manner:

the TOC is measured of a known amount of clay-free sand (e.g. pure AFNOR sand);

a known amount of composition (C) of the invention is added to a known amount of clay-free sand (e.g. pure AFNOR sand), mixed, filtered (mixing and filtering can preferably be the same as in steps c) and d) mentioned above) and the colour of the filtrate obtained is observed which will give the colour of a clay-free sand;

the TOC is measured of a known amount of at least two commercial sands (e.g. Osman sand, Signes sand, St Marthe sand, Lecieux sand, Fulchiron sand, Vernou sand, Vesseny sand, Goutrens sand, Bernieres sand, Inerti Salinello sand, Siegwart sand, TRK sand, Sail s/s Couzan sand);

a known amount of composition (C) of the invention is added to at least two commercial sands (e.g. Osman sand, Signes sand, St Marthe sand, Lecieux sand, Fulchiron sand, Vernou sand, Vesseny sand, Goutrens sand, Bernieres sand, Inerti Salinello sand, Siegwart sand, TRK sand, Sail s/s Couzan sand), mixed, filtered (mixing and filtering can preferably be the same as in steps c) and d) mentioned above) and the colour of the filtrates obtained is observed; the TOC value is connected with the colour range obtained which will give a colour gradient as a function of the range of clay concentration.

With the present invention it is advantageously possible to predict the dosage of CMA compound to be used to limit and even eliminate the harmful effects of clays, in particular on water reduction and maintained workability. For this purpose, a correlation curve is plotted allowing required CMA dosage to be determined as a function of the colour or absorbance (photometric measurement) obtained at step e).

This correlation curve can be obtained by determining the amount of CMA to be used as a function of the clay concentration in the sand, the relationship between clay concentration in the sand and the colour or absorbance (photometric measurement) obtained at step e) being detailed above.

The correlation curve between the amount of CMA to be used as a function of the clay concentration in the sand can be obtained in the following manner:

slump at 5 minutes (T5) and slump retention of a reference mortar obtained with AFNOR sand are measured;

slump at 5 minutes (T5) and slump retention are measured of at least two mortars obtained with different commercial sands (e.g. Osman sand, Signes sand, St Marthe sand, Lecieux sand, Fulchiron sand, Vernou sand, Vesseny sand, Goutrens sand, Bernieres sand, Inerti Salinello sand, Siegwart sand, TRK sand, Sail s/s Couzan sand);

the CMA is added to the mortars obtained with different commercial sands to obtain slump at 5 minutes (T5) and slump retention similar to those obtained with the reference mortar;

the curve indicating the amount of CMA to be added as a function of clay concentration in the sand can be inferred therefrom.

It is then possible with the calibration curves described above to determine the CMA quantity curve as a function of the colour or absorbance value (photometric measurement) obtained at step e). This curve is preferably plotted as a function of the hydraulic binder used in the mortar.

Slump can be assessed in particular as follows:
A cone-shaped bottomless mould is used reproducing the Abrams cone on a scale of 0.5 (see standard NF 18-451, 1981) of following dimensions: upper circle diameter=5 cm, circle diameter of base=10 cm, height 15 cm. After mixing the mortar containing the polymer, it is poured into the mould and levelled flush with the top surface of the cone. The cone is lifted vertically and slump is measured at 900 with a tape measure.

It is possible to adjust the pH of the filtrates before reading the colour (visually or by spectrometry) to lie within the range of pH values allowing viewing of the colour of the coloured compound.

Before any photometric measurement of absorbance, it is recommended to carry out photometric measurement of a blank. The blank can be water or the buffer solution used in composition (C). The obtaining of a blank allows the averting of any variation in measurement related to any element external to the mixture to be analysed, for example the container comprising the mixture to be analysed.

The present invention also concerns a kit to implement the method of the invention, comprising:
  A container provided with a stopper comprising (C) of the invention;
  A container for dosing the sand sample;
  Means for sampling liquid;
  Filtering means;
  A container to recover the filtrate;
  A calibration curve allowing colour to be related to the clay concentration of the sand and/or a correlation curve allowing colour to be related to the amount of CMA to be used.

Preferably, the container for recovering the filtrate is a transparent container allowing the colour of the filtrate to be seen. Preferably, the container for recovering the filtrate is adapted for photometric analysis of absorbance.

Preferably, the sand sample is poured into the container provided with a stopper comprising composition (C) of the invention.

Preferably, the liquid sampling means are a syringe.

Preferably, the filtering means are a syringe filter preferably having porosity of between 0.25 and 5 μm, preferably between 0.25 and 2 μm.

Preferably, the kit of the invention comprises an instrument for photometric measurement of absorbance. Preferably the instrument for photometric measurement of absorbance is a colorimetry instrument having a laser wavelength of between 400 and 700 nm, preferably between 475 and 600 nm.

The kit of the invention may also comprise an acid or base solution advantageously allowing pH to be adjusted to within the range of pH values enabling visualisation of the colour of the coloured compound.

The present invention also concerns a method for determining the amount of CMA to be added to a sand for use thereof in a hydraulic binder composition, comprising the following steps:
  Implementing the method for analysing the quantity of clay in a sand according to the invention;
  Plotting a correlation curve to relate the concentration of clay in a sand with the amount of CMA to be used for neutralising the clay, for example such as described above;
  Entering the value obtained, by implementing the method of the invention for analysing the quantity of clay in a sand, into the equivalence curve.

The present invention also concerns a method for determining the amount of CMA to be added to a sand for use thereof in a hydraulic binder composition, comprising the following steps:
  i) Providing a composition (C) of the invention;
  ii) Taking a sample of sand to be analysed;
  iii) Mixing composition (C) with the sand sample in a container and agitating;
  iv) Filtering the mixture obtained at step iii);
  v) Determining the amount of CMA to be added as a function of the colour of the solution obtained at step iv).

Steps ii), iii) and iv) can be performed in the same manner as steps b), c) and d) described above.

Step v) can be performed in the same manner as step e) described above, and the correlation curves between absorbance value and amount of CMA to be added can be plotted as described previously.

Preferably, the present invention concerns a compound of formula (I)

$$R^1-(OA)_n-XR^2 \qquad (I)$$

where:

$R^1$ is a linear or branched C1 to C4 alkyl group, or a derivative of azobenzene having a COOH function whether or not neutralised reacting with the XH function;

$R^2$ is a derivative of azobenzene having a COOH function whether or not neutralised reacting with the XH function;

A, each the same or different, is independently a —$CH_2$—$CH_2$— group or —$CH(CH_3)$—$CH_2$— group;

n is an integer of between 1 and 500, preferably between 4 and 250.

X is O or NH.

Preferably $R^1$ is a linear or branched C1 to C4 alkyl group and $R^2$ is:

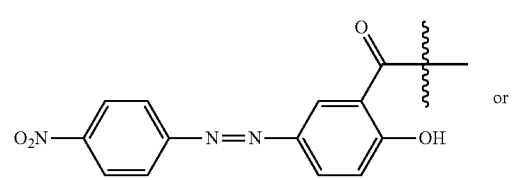 or

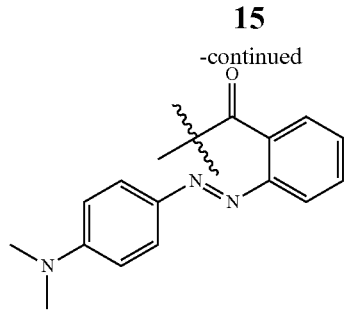

A description of the present invention is now given with the aid of nonlimiting examples.

DESCRIPTION OF THE PREFERRED EMBODIMENTS

Figure 1:
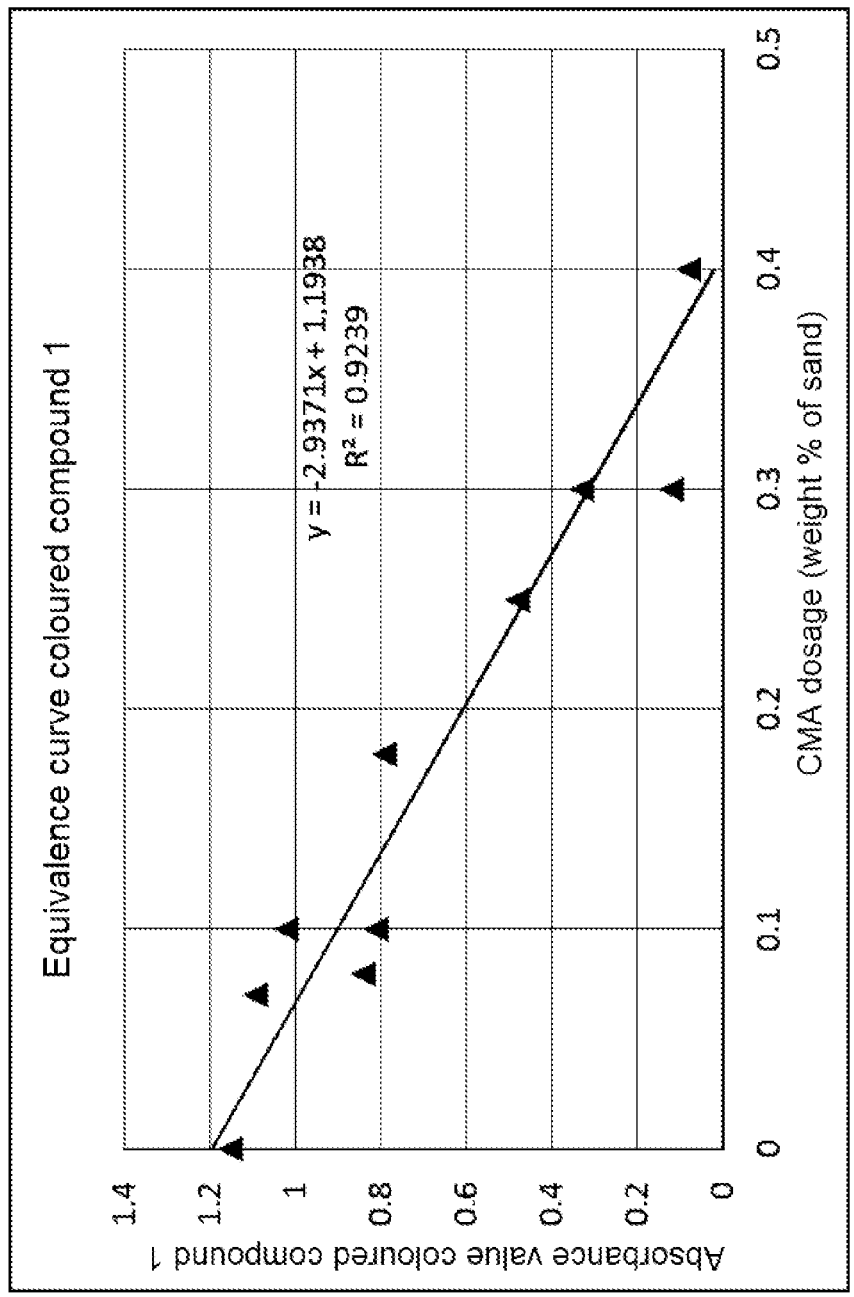
FIG. 1 illustrates the correlation curve between the concentration of CMA to be used and the absorbance value measured for composition (C1) in Example 1.

Example 1: Synthesis 1 of a Composition (C1) of the Invention

A twin-neck round bottom flask fitted with a Dean Stark was charged with 8.08 g of compound A, 140.80 g of MPEG 5000 and 1.13 g of sodium hydroxide solution (50% dry extract) and placed under agitation. The reaction medium was brought to 165° C. under a vacuum of 20 mbars. The reaction medium was held under these conditions for 6 h. The temperature was lowered to room temperature and the reaction medium diluted with a buffer (acetic acid/0.1 M sodium acetate) to obtain the desired dry extract (0.04 weight %).

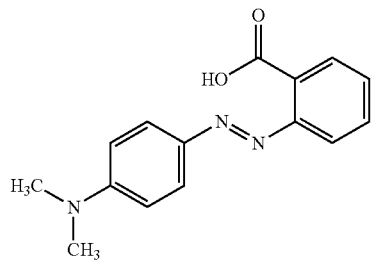

Compound A

Example 2: Synthesis of a Composition (C2) of the Invention

A twin-neck round bottom flask fitted with a Dean Stark was charged with 3.04 g of compound B, 31.71 g of MPEG 5000 and 0.25 g of sodium hydroxide solution (50% dry extract) and placed under agitation. The reaction medium was brought to 165° C. under a vacuum of 20 mbars. The reaction medium was held under these conditions for 6 h. The temperature was lowered to room temperature and the reaction medium diluted to obtain the desired dry extract (0.1 weight %).

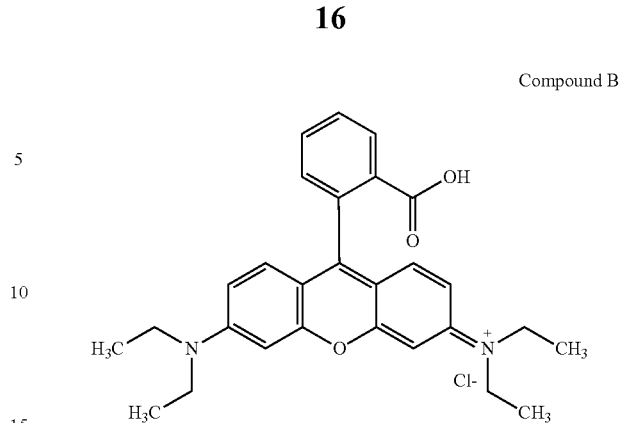

Compound B

Example 3: Synthesis of a Composition (C3) of the Invention

A twin-neck round bottom flask fitted with a Dean Stark was charged with 7.60 g of compound C, 141.27 g of MPEG 5000 and 1.13 g of sodium hydroxide solution (50% dry extract) and placed under agitation. The reaction medium was brought to 165° C. under a vacuum of 20 mbars. The reaction medium was held under these conditions for 6 h. The temperature was lowered to room temperature and the reaction medium diluted to obtain the desired dry extract (0.04 weight %).

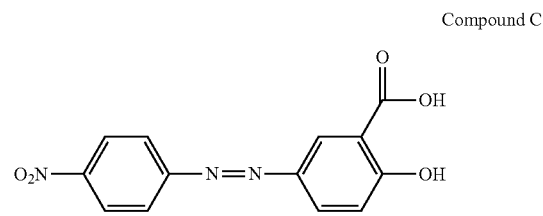 [SMILES: O=C(O)c1cc(N=Nc2ccc([N+](=O)[O-])cc2)ccc1O]

Compound C

Example 4: Plotting a Straight Line Linking Clay Concentration with TOC Value Consumption of MPEG5000 by clays, Montmorillonite in particular, is determined by the difference between the amount of MPEG 5000 in solution before adding sand to the polymer solution and after a contact time of 5 min between the sand and this solution. The TOC content in the filtrate of a sand suspension without polymers is also measured and used as a blank for TOC measurements.

TOC measurement was performed on the initial solutions and on the filtrates with a SHIMADZU TOC-VCPN analyser. TOC was calculated by the difference between the amount of total carbon (obtained by carbonisation of the solution and infrared measurement of the quantity of $CO_2$ released) and the quantity of inorganic carbon (obtained by acidification of the solution to pH<1 and release of dissolved $CO_2$ by bubbling with synthetic air). The amount of consumed MPEG5000 was calculated by the difference between the amount added to the initial solution and the amount measured in the filtrates.

Consumption of MPEG 5000 was measured on different sands sampled on site for initial doses of 0.4. The montmorillonite equivalent (EqMnt) was calculated from the following equation:

$$EqMnt = \frac{m_{consumed\ MPEG} + 0.3648}{1.1943} \quad (1)$$

The sands sampled on site were the following: Osman sand, Signes sand, St Marthe sand, Lecieux sand, Fulchiron sand, Vernou sand, Vesseny sand, Goutrens sand, Bernières sand, Inerti Salinello sand, Siegwart sand, TRK sand, Sail s/s Couzan sand.

This allows a straight line to be obtained linking clay concentration with TOC value.

Example 5: Obtaining a Calibration Curve of Absorbance Value as a Function of Clay Concentration 50 g of AFNOR sand (free of clay) were sampled and placed in a container comprising 50 g of composition (C1) of Example 1. The mixture was agitated 30 seconds and left to settle for about 2 minutes so that the finest particles fell to the bottom to prevent clogging of the filter. 10 ml of supernatant were taken and filtered with a 1 μm glass fibre syringe filter. The filtrate obtained was recovered in a glass tube for photometric measurement of absorbance (A1). Before absorbance measurement, 2 drops of HCl were added to the filtrate. Before measurement of absorbance of the filtrate, a blank was prepared with a buffer solution (acetic acid/0.1 M sodium acetate). The absorbance of composition (C1) was measured and this value subtracted from absorbance measurement (A1).

The same protocol was followed with the following sands: Osman sand, Signes sand, St Marth sande, Lecieux sand, Fulchiron sand, Vernou sand, Vesseny sand, Goutrens sand sand, sandBernieres, Inerti Salinello sand, Siegwart sand, TRK sand, Sail s/s Couzan sand. Absorbance was measured (An). Before absorbance measurement, 2 drops of HCl were added to the filtrates. Before measuring absorbance of the filtrate, a blank was prepared with a buffer solution (acetic acid/0.1 M sodium acetate). The absorbance of composition (C1) was measured and this value subtracted from absorbance measurements (An).

Correlation with the straight line obtained in Example 4 allowed a curve of absorbance value to be obtained as a function of clay concentration.

A similar protocol was followed with composition (C2) of Example 2.

Example 6: Obtaining a Correlation Straight Line Between Amount of CMA to be Added and Absorbance Value 4 mortars were prepared with the following composition:
624.9 g of CEM I 52.5N CE CP2 NF SPLC cement
W/C=0.6
734.98 cm³ of sand The aggregate curves of the mortars were homogenised by associating the sand of interest with Fulchiron sand which does not contain clay (to avoid influence of the aggregate curve and therefore only examine the effect of the clays), in the following volume proportions:

TABLE 1

|  | Sand of interest | Volume fraction of sand of interest (weight %) | Volume fraction of Fulchiron sand (weight %) |
|---|---|---|---|
| Mortar 1 - Ref. | AFNOR | 69.5 | 30.5 |
| Mortar 2 | Sail sous Couzan | 49 | 51 |
| Mortar 3 | Siegwart | 78.6 | 21.4 |
| Mortar 4 | Vernou | 59.3 | 40.7. |

Slump at T5 and slump retention were measured for reference mortar 1 not containing clay. Slump was assessed as follows:

A cone-shaped bottomless mould was used reproducing the Abrams cone on a scale of 0.5 (see standard NF 18-451, 1981) having the following dimensions: diameter of upper circle=5 cm, diameter of base circle=10 cm, height 15 cm. After mixing the mortar containing the polymer, it was poured into the mould and levelled flush with the top surface of the cone. The cone was lifted vertically and slump measured at 900 with a tape measure.

Slump at T5 and slump retention were measured for mortars 2 to 4.

The CMA (CHRYSO@Quad 800) was added to mortars 2 to 4 until measurements of slump at T5 and slump retention were similar to those of the reference mortar 1.

The results were as follows:

TABLE 2

|  | Recommended CMA dosage (wt. % sand of interest) |
|---|---|
| Mortar 1 - Ref | — |
| Mortar 2 | 0.3 |
| Mortar 3 | 0.25 |
| Mortar 4 | 0.15 |

A straight line can therefore be drawn between the amount of CMA to be used as a function of sand type and hence clay content (the quantity of clay in each of the sands having been obtained in Example 4), and by correlation with the curves in Examples 4 and 5 the correlation curve can be inferred indicating the CMA concentration to be used as a function of absorbance value.

Figure 2:
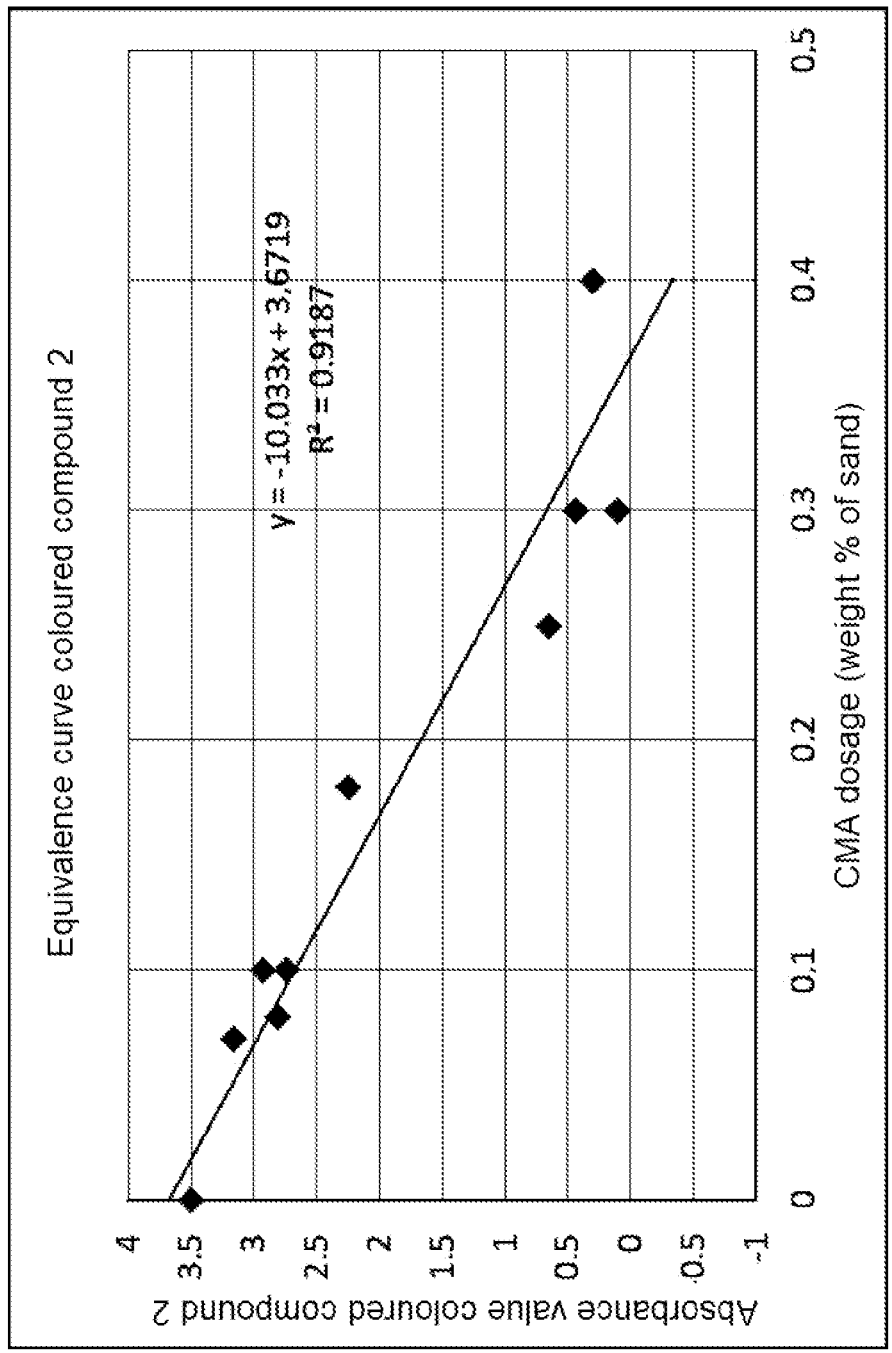
FIG. 2 illustrates the correlation curve between the concentration of CMA to be used and the absorbance value measured for composition (C2) in Example 2.

The two curves obtained for compositions (C1) and (C2) in Examples 1 and 2 are given in FIGS. 1 and 2 respectively.

The calibration curves are dependent on the cements used.

Example 7: Operating Mode of the Colorimetric Test

Providing a container (100 mL bottle) fitted with a stopper comprising 50 ml of composition (C) of the invention.
Placing the sampled sand in a 35 mL container (i.e. about 10 g of sand).
Agitating for about 30 seconds and leaving to settle.
Taking a sample of the supernatant liquid (10 mL syringe).
Filtering (1 μm glass fibre syringe filter) into a container adapted for photometric analysis of absorbance.
Photometric measurement of absorbance with an instrument allowing measurements at a wavelength of 525 nm.
Entering the value given by the instrument onto an equivalence curve allowing absorbance value to be related to required CMA dosage.

The invention claimed is:

1. A method for determining the concentration of superplasticizer-intercalating clays in a sand, comprising:
   a) providing a composition (C) comprising a compound of formula (I) R$^1$µ—(OA)$_n$—XR$^2$ (I)
   where:
   R$^1$ is a linear or branched C1 to C4 alkyl group, or a coloured subunit;
   R$^2$ is a coloured subunit;
   A, each the same or different, is independently —CH$_2$—CH$_2$— or —CH(CH$_3$)—CH$_2$—;
   n is an integer of between 1 and 500; and
   X is O or NH;
   b) taking a sample of the sand to be analysed;
   c) mixing composition (C) with the sample of the sand in a container and agitating, to obtain a mixture;
   d) filtering the mixture obtained at step c), to obtain a solution; and
   e) determining the concentration of superplasticizer-intercalating clays in the sand as a function of the colour of the solution obtained at step d).

2. The method according to claim 1, wherein step e) is performed by visual determination of the colour and correlation of this colour with a range of quantities of superplasticizer-intercalating clays, or step e) is performed by photometric measurement and further comprises:
   step e1) measuring a value of absorbance of the solution obtained at step d) by photometry,
   step e2) subtracting the value of absorbance obtained at step e1) from a value, measured by photometry, of absorbance of composition (C), to obtain a difference, and
   step e3) comparing the difference to a calibration curve to determine the weight percentage of superplasticizer-intercalating clays in the sand.

3. The method according to claim 1, wherein R$^1$ is a methyl, propyl, ethyl or butyl group.

4. The method of claim 3, wherein X is O.

5. The method of claim 4, wherein n is an integer between 4 and 250.

6. The method according to claim 1, wherein the compound of formula (I) results from a reaction of a compound of formula (II) Y—(OA)$_n$—XH (II) with a reactant compound;
   where:
   Y is a linear or branched C1 to C4 alkyl group; and
   A, X and n are such as defined for the compound of formula (I); and
   the reactant compound is selected from:
   a derivative of azobenzene having a COOH functional group or a COO$^-$ functional group and capable of reacting with the XH functional group,
   a derivative of acridine having a COOH functional group or a COO$^-$ functional group and capable of reacting with the XH functional group,
   a derivative of anthraquinone having a COOH functional group or a COO$^-$ functional group and capable of reacting with the XH functional group,
   a derivative of phthalocyanine having a COOH functional group or a COO$^-$ functional group and capable of reacting with the XH functional group,
   a derivative of quinone having a COOH functional group or a COO$^-$ functional group and capable of reacting with the XH functional group,
   a derivative of indophenol having a COOH functional group or a COO functional group and capable of reacting with the XH functional group,
   a derivative of oxazone having a COOH functional group or a COO$^-$ functional group and capable of reacting with the XH functional group,
   a derivative of thiazine having a COOH functional group or a COO$^-$ functional group and capable of reacting with the XH functional group,
   a derivative of xanthene having a COOH functional group or a COO$^-$ functional group and capable of reacting with the XH functional group, and
   a derivative of fluorone having a COOH functional group or a COO$^-$ functional group and capable of reacting with the XH functional group.

7. The method according to claim 1, wherein the compound of formula (I) results from a reaction of a compound of formula (II) Y—(OA)$_n$—XH (II) with a reactant compound;
   where:
   Y is a linear or branched C1 to C4 alkyl group; and
   A, X and n are such as defined for the compound of formula (I); and
   the reactant compound is selected from:
   a derivative of azobenzene having a COOH functional group or a COO$^-$ functional group and capable of reacting with the XH functional group, and
   a derivative of xanthene having a COOH functional group or a COO$^-$ functional group and capable of reacting with the XH functional group.

8. The method according to claim 1, wherein the compound of formula (I) results from a reaction of a compound of formula (II) Y—(OA)$_n$—XH (II) with a reactant compound;
   where:
   Y is a linear or branched C1 to C4 alkyl group; and
   A, X and n are such as defined for the compound of formula (I); and
   the reactant compound is selected from:
   a derivative of azobenzene having a COOH functional group or a COO$^-$ functional group and capable of reacting with the XH functional group, and
   a derivative of rhodamine having a COOH functional group or a COO$^-$ functional group and capable of reacting with the XH functional group.

9. The method according to claim 1, wherein each coloured subunit is independently selected from:

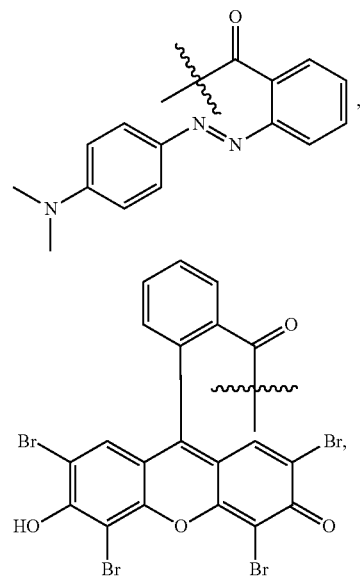

-continued

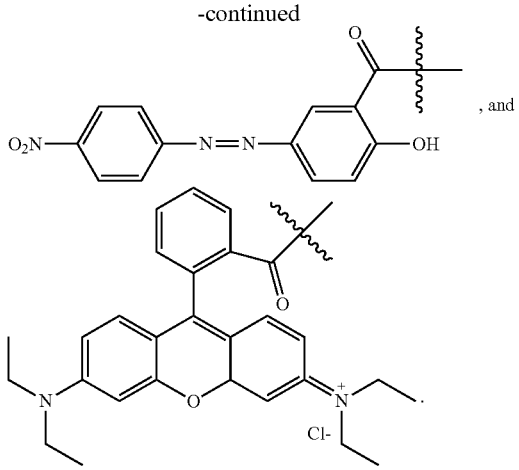

, and

10. The method according to claim 1, wherein each coloured subunit is independently selected from:

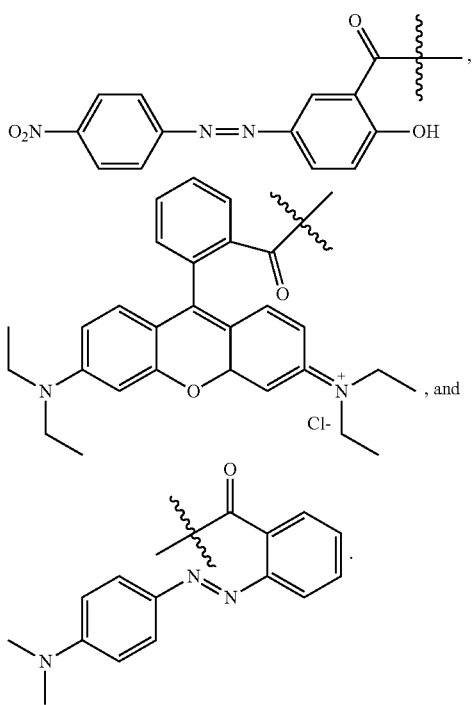

11. The method according to claim 1, wherein composition (C) further comprises a pH buffer.

12. The method of claim 1, wherein n is an integer between 4 and 250.

13. A method for determining an amount of clay mitigation agent (CMA) to be added to a sand for use in a hydraulic binder composition, comprising:
1) plotting a correlation curve allowing a concentration of superplasticizer-intercalating clay in a sand type to be related to an amount of CMA to be used for preventing absorption of water and intercalation of superplasticizers by the clay;
2) applying the method for determining the concentration of superplasticizer-intercalating clays according to claim 10 to a sample of the sand to obtain a value corresponding to the concentration of superplasticizer-intercalating clays in the sand; and
3) comparing the value obtained after implementing the method according to claim 1 to the correlation curve and inferring the amount of CMA to be added.

14. A method for determining an amount of clay mitigation agent (CMA) to be added to a sand for use in a hydraulic binder composition, comprising:
i) providing a composition (C);
ii) taking a sample of the sand;
iii) mixing the composition (C) with the sample of the sand in a container and agitating, to obtain a mixture;
iv) filtering the mixture obtained at step iii), to obtain a solution; and
v) determining the amount of CMA to be added as a function of the colour of the solution obtained at step iv);
wherein composition (C) comprises a compound of formula (I) $R^1$—$(OA)_n$—$XR^2$ (I)
where:
$R^1$ is a linear or branched C1 to C4 alkyl group, or a coloured subunit;
$R^2$ is a coloured subunit;
A, each the same or different, is independently —$CH_2$—$CH_2$— or –$CH(CH_3)$—$CH_2$—;
n is an integer of between 1 and 500; and
X is O or NH.

15. The method of claim 14, wherein n is an integer between 4 and 250.

* * * * *